Aug. 9, 1932.  E. WITTOUCK ET AL  1,870,548
COUPLING OF AGRICULTURAL MACHINES
Filed Oct. 25, 1928
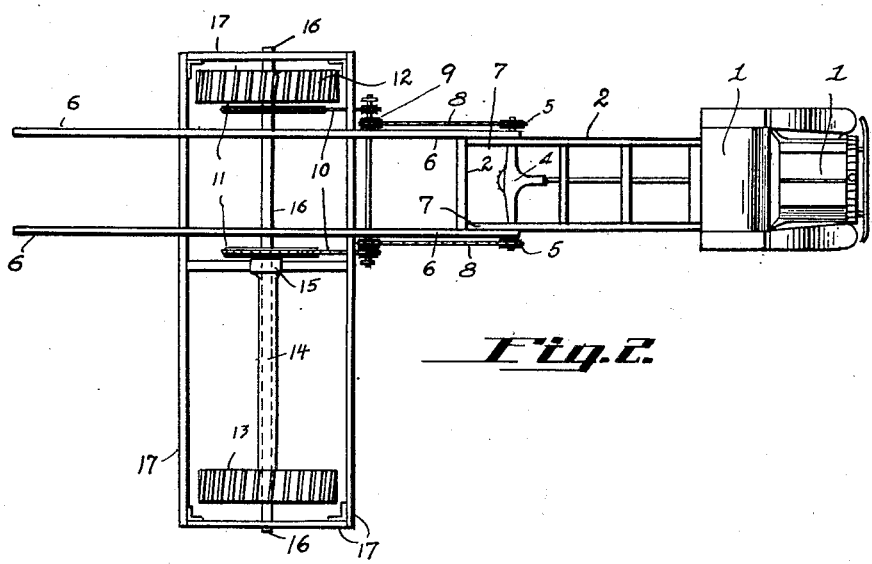
INVENTORS:
E. Wittouck and A.G. Wittouck
BY
ATTORNEYS.

Patented Aug. 9, 1932

1,870,548

UNITED STATES PATENT OFFICE

ENRIQUE WITTOUCK AND ADOLFO GUILLERMO WITTOUCK, OF BUENOS AIRES, ARGENTINA

COUPLING OF AGRICULTURAL MACHINES

Application filed October 25, 1928, Serial No. 315,073, and in Argentina September 4, 1928.

This invention relates to improvements in motor driven vehicles, and more particularly to an attachment for conventional types of motor trucks and like vehicles.

The object of the invention is the provision of an arrangement whereby harvesting machines and like agricultural implements may be coupled to the chassis of a conventional form of motor vehicle, subsequent to the removal of the rear wheels of such vehicle, and the power ordinarily supplied by the motor of the vehicle transmitted to the supporting wheels of the agricultural implement, and thus the latter together with the motor vehicle chassis are propelled, the steering gear of the motor vehicle being utilized for the purpose of steering the entire assembly.

A further object of the invention is the provision of an arrangement of the character stated wherein separate driving connections between the right and left hand driving axles of the vehicle chassis are provided for the corresponding wheels of the agricultural machine so that the differential gear of the motor vehicle may be utilized for accommodating the difference in velocity of the wheels of the agricultural implement incident to travel thereof.

In the accompanying drawing, wherein an approved embodiment of the invention is illustrated, Fig. 1 is a side elevation of the invention applied to use;

Fig. 2 is a top plan view thereof; and Fig. 3 is a rear elevation.

Referring to the drawing in detail, the numeral 2 indicates the chassis of a conventional form of motor truck or like vehicle provided with the usual hood 1 enclosing the propelling engine which is coupled as usual through a drive shaft 1a to the drive axles 1b through the conventional differential gear located in the rear axle housing 4.

The parts described in the foregoing are conventional in the usual motor trucks employed for hauling and like heavy duty, and in applying the invention to use the usual rear wheels of the truck are removed and replaced by sprocket wheels 5. As a matter of convenience the conventional motor truck is designated at A and the attached agricultural machine is designated at B, the latter including longitudinal draft bars 6 which are bolted or otherwise rigidly secured to the opposed side members of the chassis 2 as indicated at 7. A counter shaft 9a is mounted in the draft bars 6 and supports pairs of independently rotatable sprocket wheels 9. Each pair includes a relatively large wheel connected with the vehicle sprocket wheels 5 through chains 8, while the relatively smaller sprocket wheel of each pair is connected through a chain 10 with a relatively larger sprocket wheel 11, whereby the latter wheels are rotated at a lower speed than the vehicle drive axles 1a.

The bars or members 6 constitute part of a frame or chassis structure which also includes the transverse members 17 which are connected at intervals by the cross pieces 17a, the entire structure being reinforced and braced by inverted arch members 19 trussed at intervals by the vertical truss members 18 and 20.

A supporting axle 16 is journalled in the frame structure constituted by the members 6 and 17a, and a tubular drive shaft 14 is mounted on one terminal thereof. The opposite terminal of the supporting shaft or axle 16 is rigidly connected with a supporting and driving wheel 12 connected with the adjacent sprocket wheel 11 whereby rotary movement is imparted to the wheel 12 from the left drive axle of the vehicle A through the wheel 5, drive chain 8, gear pair 9 and chain 10.

The opposite or right hand side of the frame of the attachment B is supported on a drive wheel 13 coupled with the tubular drive shaft 14 on which the other sprocket wheel 11 is non-rotatably mounted, whereby the rotary motion of the right drive axle of the vehicle A is transmitted to the right drive wheel 13 of the attachment.

The weight of the rear axle housing 4 and drive shaft 1a, when the vehicle A is coupled with the second machine B, is carried by supports 3 suitably connected with the vehicle chassis 2 and engaging axle housing 4 adjacent the extremities of the latter.

When the invention is applied to use, the power of the propelling engine of the motor truck which is ordinarily transmitted to the truck wheels is transmitted through the chain and gear wheels to the supporting and propelling wheels 12 and 13 of the attachment and, as it will be understood, the supporting frame of the latter constituted by the members 6 and 17 may be utilized to support any preferred form of agricultural or other machine. The front supporting wheels of the motor truck A are operated as usual from the vehicle steering wheel to control the course of the tractor with the attachment applied thereto.

What we claim is:

An attachment for motor vehicles including a supporting frame, supporting and driving wheels for said frame mounted for relative rotation, means for connecting the frame with the motor vehicle chassis, a lateral extension on said frame, an axle passing through said frame at the lateral extension thereof and directly supporting one of the drive wheels at one side of the attachment, a tubular drive shaft mounted on a partion of said axle located in the lateral extension of said frame and supporting the other drive wheel at the opposite side of said attachment, and power transmitting connections coacting with the axle and tubular drive shaft and adapted for connection with the respective rear axles of a motor vehicle.

In testimony whereof, we affix our signatures.

ENRIQUE WITTOUCK.
ADOLFO GUILLERMO WITTOUCK.